Patented Feb. 18, 1930

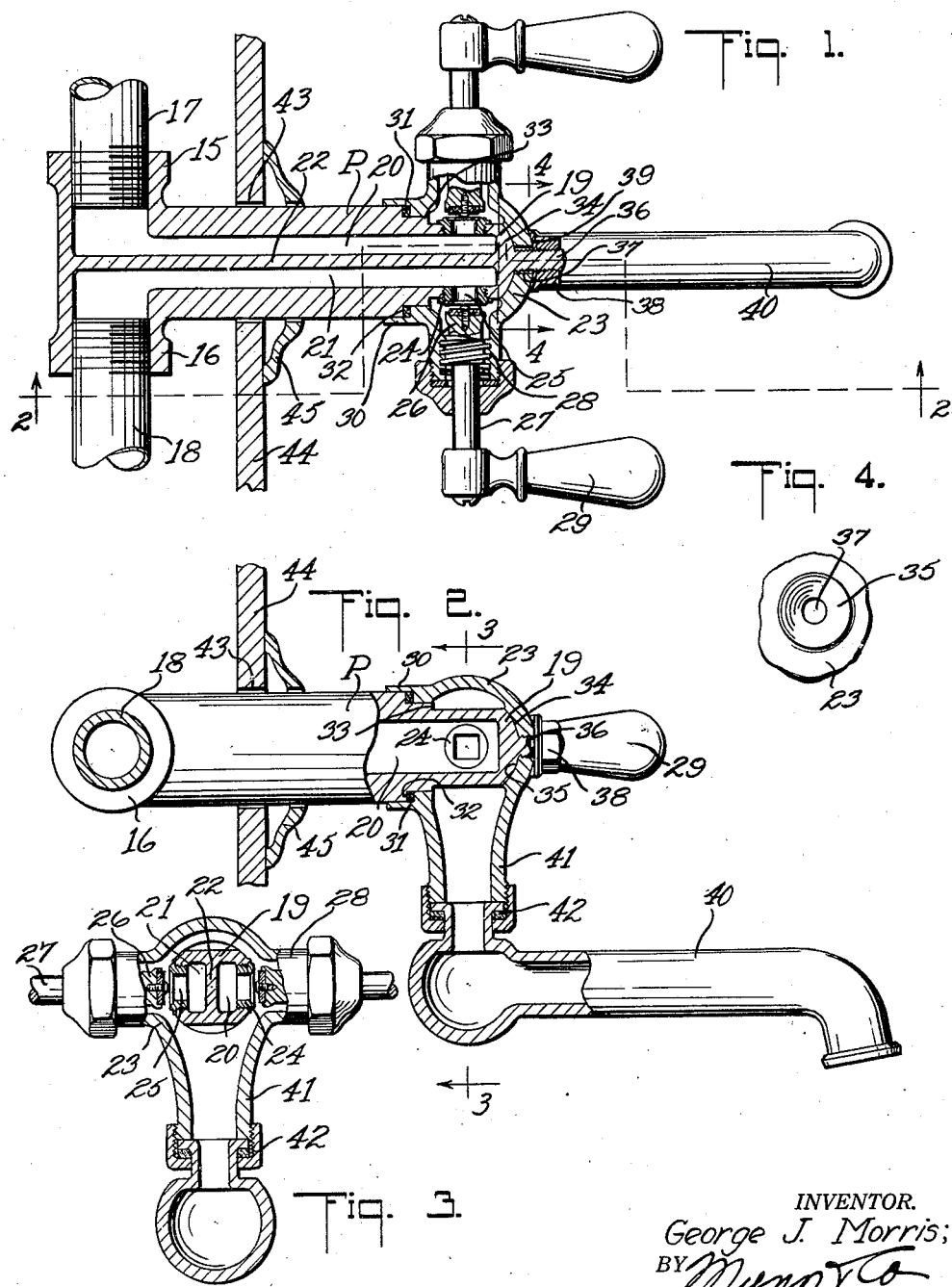

1,747,640

UNITED STATES PATENT OFFICE

GEORGE J. MORRIS, OF LOS ANGELES, CALIFORNIA

FAUCET FITTING

Application filed November 15, 1927. Serial No. 233,415.

My invention relates to faucet fittings of the character embodied in my co-pending application, Serial Number 170,312, filed Feb. 23, 1927, in which the fitting embodies a single feed pipe for separately conducting hot and cold water to a single nozzle.

It is a purpose of my invention to provide a faucet fitting of the above described character which comprises a body and faucet head connection allowing ready removability of the faucet and reversibility of the swinging spout to occupy positions above or below the faucet head so that in its adaptation to sinks and tubs the spout can be adjusted in elevation in respect to the bottom of the sink or tub.

It is also a purpose of my invention to provide a faucet fitting which is simplified in construction to maintain its manufacturing cost low; a fitting having removable valve seats which are readily accessible for replacement when necessary; and a fitting which can be quickly roughed in and finished with only one connection to be made. I will describe only one form of faucet fitting embodying my invention and will then point out the novel features in claims.

In the accompanying drawings:

Fig. 1 is a view showing in horizontal section one form of faucet fitting embodying my invention in applied position to water supply pipes and a sink or tub;

Fig. 2 is a vertical sectional view taken on the line 2—2 of Fig. 1;

Fig. 3 is a vertical sectional view taken on the line 3—3 of Fig. 2;

Fig. 4 is a fragmentary sectional view taken on the line 4—4 of Fig. 1.

My invention in its present embodiment comprises a suitable length of pipe P having at one end a T head to provide oppositely disposed nipples 15 and 16, designed for connection to hot and cold water supply pipes 17 and 18, respectively. The pipe P is provided at its opposite end with a head 19 reduced in cross-sectional area and non-circular in cross section, as clearly illustrated in Fig. 3. Interiorly the pipe P is divided into two separate passages 20 and 21 by a partition 22 which extends into the heads at the opposite ends thereof so that each passage is continuous from the respective supply pipe 17 or 18 to the head 19.

The opposite sides of the pipe head 19 are provided with outlet ports, one for each of the passages, through which the hot or cold water from the pipe 17 or 18 is discharged into the head 23 of a faucet mounted on the pipe. Within these outlet ports are threadedly or otherwise fitted removable valve seats 24, preferably formed with square openings 25 into which a screw-driver or other suitable tool can be extended for screwing or unscrewing the seats incident to their application or removal. The seats are flanged, as shown, to limit the inward screwing thereof in order that their inner edges will lie flush with the inner surfaces of the passages 20 and 21, and thereby present no obstruction to the free flow of water through the passages and out of the ports. The ports are controlled by valves 26 on stems 27 threaded in nipple extensions 28 of the faucet head 23, the stems being provided with handles 29 by which they can be manually rotated to seat or unseat the valves and to thereby open or close the outlet ports.

Through the provision of a collar 30 the faucet head 23 is fitted on the pipe P, such collar being constructed interiorly to correspond to the non-circular contour of the pipe head 19 so as to prevent turning of the faucet on the pipe. This collar may be extended to overlap the intervening joint between the pipe and faucet head, and a gasket 31 is seated against a shoulder 32 of the pipe P to render this joint watertight. It is important to note that the collar 30 is seated on an angular portion 33 of the head 19 which is of greater cross-sectional area than the remainder of the head in order that proper clearance may be provided for the valve seats 24 to permit the free removal of the faucet as a whole from the pipe, it being understood that when removing the faucet from the pipe the valves 26 are in unseated relation to the seats 24.

In order to removably secure the faucet against accidental displacement from the pipe and yet permit the ready removal thereof when required, the outer end of the pipe head 19 is formed with a rounded surface 34 which constitutes a head or seating within a rounded socket 35 formed on the inner surface of the faucet head 23, as clearly illustrated in Figs. 2 and 4. Projecting centrally from the pipe head 19 is a stud 36 which extends through an opening 37 in the faucet head 23 and centrally of the socket 35. That portion of the stud exteriorly of the faucet head is adapted to receive a nut 38 and a washer 39 for securing the faucet as a unit against longitudinal displacement from the pipe. The head and socket connection between the pipe and faucet serves to provide a substantial bearing surface for the pipe P against which the faucet head can seat thereby providing a rigid and substantial support for the faucet as well as a centering means for the stud in respect to the opening 37.

The faucet includes a swinging spout 40 mounted on an extension 41 of the faucet head and connected thereto by a union nut 42. This extension 41 is in communication with the interior of the faucet head 23 so as to receive water discharged from either of the outlet ports and to conduct the water to the spout 40 for discharge therefrom.

In practice, the pipe P is extended through a suitable opening 43 of the apron of a sink or the side wall of a tub, indicated at 44, the faucet being first removed from the pipe to permit the extension of the latter through the opening as will be understood. With the T head connected to the hot and cold water supply pipes in the manner illustrated, and the faucet applied to the pipe head 19, it will be clear that water traversing the passages 20 and 21 can be separately discharged from the nozzle 40 in accordance with an adjustment of the valves 26 in respect to the seats 24, and consequently any combination of hot and cold water or a single discharge of either hot or cold water can be effected as desired. The pipe P is not threaded in the element 44 but is supported in horizontal position by virtue of its connection to the supply pipes 17 and 18 as provided by the T head, and consequently the application of the fitting to a sink or tub is greatly simplified. It will be understood that the length of the pipe P is such as to compensate for any variation in distance between the element 44 and the supply pipes 17 and 18, the joint between the pipe and the element 44 being covered by an escutcheon plate 45.

By reason of the cross-sectional angularity of the pipe head 19 and the corresponding contour of the interior of the faucet head or collar 30, the faucet, when in applied position upon the pipe, is naturally locked against circumferential movement about the pipe as a center and consequently the valves 26 are maintained in proper operative relation to the seats 24 so as to open or close the outlet ports therein.

To remove the faucet from the pipe P incident to the dismounting of the fitting, all for the purpose of gaining access to the valve seats 24 for the purpose of replacement should they become worn, it will be clear that the faucet can be readily removed by first moving the valves 26 to an unseated or open position, and then removing the nut 38 from the stud 36. This allows the longitudinal removal of the faucet from the pipe thus rendering the valve seats accessible and the withdrawal of the pipe P through the opening 43 if desired. It also permits a reversal in position of the faucet on the pipe in order to dispose the spout 40 above the pipe P instead of below, as illustrated in the drawing. It is often necessary that the spout be reversed to this uppermost position for the reason that there is not sufficient space between the spout and the bottom of the tub or sink to permit the placing of receptacles in the sink or tub and beneath the spout to allow filling thereof. By reversing the position of the faucet on the pipe so as to dispose the spout above the latter, it will be manifest that additional space is provided to accommodate the receptacles. In this reverse position of the faucet the relation of the valves 26 with respect to the seats 24 is unchanged so that the valves still function to control the discharge of water through the outlet ports. It will, of course, be understood that when the faucet is reversed to place the spout above the pipe, it will be necessary to employ a spout with both inlet and outlet turned in the same direction, so that the outlet will be directed downward.

Although I have herein shown and described only one form of faucet fitting embodying my invention, it is to be understood that various changes and modifications may be made herein without departing from the spirit of the invention and the spirit and scope of the appended claims.

I claim:

1. A faucet fitting comprising a pipe divided interiorly into passages, outlet ports in the pipe for the passages, and a faucet removably fitted on and receiving and enclosing that portion of the pipe having the outlet ports and having valves controlling the ports.

2. A faucet fitting comprising a pipe divided interiorly into passages, outlet ports in the pipe for the passages, a faucet on and receiving and enclosing that portion of the pipe having the outlet ports and having valves controlling the ports, and a connection between the pipe and faucet permitting mounting of the faucet on the pipe to dispose the spout of the faucet above or below the pipe.

3. A faucet fitting comprising a pipe divided interiorly into passages, a head on the pipe of non-circular cross section, outlet ports in the head through which water from the passages is separately discharged, a faucet having a head removably fitted on the pipe head and having a non-circular bore corresponding to the cross-sectional contour of the pipe head, and valves in the faucet head controlling said ports.

4. A faucet fitting comprising a pipe divided interiorly into passages, a head on the pipe of non-circular cross section, outlet ports in the head through which water from the passages is separately discharged, a faucet having a head removably fitted on the pipe head and having a non-circular bore corresponding to the cross-sectional contour of the pipe head, valves in the faucet head controlling said ports, and removable seats in the outlet ports.

5. A faucet fitting comprising a pipe divided interiorly into passages and having a reduced head provided with outlet ports, one for each of the passages, a faucet having a head receiving and enclosing the pipe head, means for detachably securing the faucet head on said pipe, and valves on the faucet controlling said ports.

6. A faucet fitting comprising a pipe having a head at one end thereof reduced in cross-sectional area and angular in cross section, the pipe and head being divided into passages, outlet ports in the head through which water from the passages can be discharged, a faucet having a head removably fitted on the pipe head and having an interior form corresponding to the exterior form of the pipe head to lock the faucet head against rotation of the pipe head, a rounded extension on the pipe head, a rounded seat in the faucet head in which the rounded extension is fitted, a stud on the extension projecting through the faucet head, a nut on said extension for forcing the faucet head into tight seating relation to the extension, and valves on the faucet controlling said ports.

7. A faucet fitting as embodied in claim 6 wherein seats are removably fitted in the outlet ports.

8. A faucet fitting comprising a pipe closed at one end and having ports in its sides privided with removable seats, a faucet removably fitted on the closed end of the pipe to permit access to the seats when the faucet is removed, and valves on the faucet for controlling said ports.

9. A faucet fitting comprising a pipe closed at one end and ports in its sides, a faucet fitted on the closed end of the pipe to enclose the ports and having valves to control the ports, and coacting means on the closed end of the pipe and on the faucet for detachably securing the faucet to the pipe.

10. A faucet fitting comprising a pipe closed at one end and having ports in its sides, a faucet fitted on the closed end of the pipe to enclose the ports and having valves to control the ports, a stud on the closed end of the pipe extending through the faucet, and a fastening member on the stud for detachably securing the faucet to the pipe.

11. A faucet fitting comprising a pipe closed at one end and having ports in its sides, a faucet fitted on the closed end of the pipe to enclose the ports and having valves to control the ports, a head on the closed end of the pipe having a stud extending through the faucet, a socket on the faucet receiving the head, and a member engaging the stud for drawing the socket into tightly seated position on the head.

12. A faucet fitting comprising a pipe of non-circular cross-section and closed at one end, ports in the sides of the closed end, a faucet having a part fitted over the non-circular pipe end, valves on the faucet for controlling the ports, and means on the pipe for detachably securing the faucet to the pipe.

13. In a faucet fitting, a pipe of non-circular cross-section and closed at one end, a rounded head on the closed end having a threaded stud, and ports in the sides of the non-circular end.

14. In a faucet fitting, a faucet having a head provided with a non-circular opening adapted to receive the non-circular end of a pipe, and a second opening longitudinally alined with respect to the first opening.

15. A faucet fitting comprising a pipe, a head on the pipe of non-circular cross-section, a port in the head, a faucet having a head removably fitted on the pipe head and having a non-circular bore corresponding to the contour of the pipe head, and a valve in the faucet head controlling said port.

16. A faucet fitting comprising a pipe, a faucet removably secured on the pipe, ports in the pipe, valves in the faucet, and means on the faucet and pipe coacting to definitely position the faucet on the pipe so that the valves will aline with the ports and when actuated they will control the ports.

GEORGE J. MORRIS.